United States Patent Office 3,264,272
Patented August 2, 1966

3,264,272
IONIC HYDROCARBON POLYMERS
Richard Watkin Rees, Wilmington, Del., assignor to E. I. du Pont de Nemours and Company, Wilmington, Del., a corporation of Delaware
No Drawing. Filed Apr. 8, 1963, Ser. No. 271,477
35 Claims. (Cl. 260—78.5)

This application is a continuation-in-part of my application Serial No. 135,147, filed August 31, 1961, now abandoned.

The present invention relates to novel hydrocarbon polymers, and, more particularly, to hydrocarbon polymers which contain ionic crosslinks.

The crosslinking of hydrocarbon polymers is well known in the art. Thus, polymeric hydrocarbon elastomers, such as natural rubber, are crosslinked or vulcanized by the use of sulfur, which reacts with the carbon of the unsaturated bonds in polymer molecules to form a bridge between two molecules so that one polymer molecule is covalently bonded to a second polymer molecule. If sufficient crosslinks of this type occur in the polymeric hydrocarbon, all molecules are joined in a single giant molecule. The characteristic property of a crosslinked polymer is its intractibility above the softening point or melting point normally observed in the uncrosslinked base polymer. Thus, whereas the uncrosslinked polymer has a marked softening point or melting point above which the polymer is fluid and deformable, the crosslinked polymer retains its shape and will tend to return that shape when deformed at all temperatures at which the polymer is stable and can not be permanently deformed. Although once crosslinked the polymer is no longer fabricable, except possibly by machining, crosslinked polymers have found wide utility because of the significant improvement in the physical properties obtained by crosslinking. Thus, by vulcanizing rubber elasticity, impact resistance, flexibility, thermal stability and many other properties are either introduced or improved. The crosslinking of non-elastomeric polymers increases the toughness, abrasion resistance and, particularly, the upper use temperatures of the material.

In addition to the vulcanization of diene hydrocarbon polymers using sulfur, other methods of crosslinking hydrocarbon polymers which do not require a double bond and which do not use sulfur have been developed. Thus, saturated hydrocarbon polymers and, in particular, polyethylene, are crosslinked by reactions resulting from the addition of a peroxide to the polymer at elevated temperatures. Peroxides decompose to form free radicals which in turn attack the polymer chain to form crosslinking sites which then react to form crosslinks. Irradiation of polyethylene also results in a crosslinked product by substantially the same mechanism except that the free radicals are generated by decomposition of the polymer itself. By either method, however, a product is obtained which is intractible and can not be further fabricated by techniques normally used in the fabrication of polyethylene, such as melt extrusion or injection molding. The improvement obtained in the solid state properties of a hydrocarbon polymer by crosslinking have, therefore, been always combined with a loss in fabricability as a result of which crosslinked hydrocarbon polymers, with the exception of elastomeric hydrocarbon polymers, have found little commercial success as compared to the uncrosslinked hydrocarbon polymers. Furthermore, crosslinking reduces the crystallinity of saturated hydrocarbon polymers, thereby decreasing the stiffness and rigidity of the product.

It is an object of the present invention to provide a new class of hydrocarbon polymers. It is a further object of the present invention to provide a new class of hydrocarbon polymers of greatly improved solid state properties. It is a further object to provide hydrocarbon polymers which combine desirable solid state properties of crosslinked hydrocarbon polymers with melt flow properties of uncrosslinked hydrocarbon polymers. Other objects will become apparent hereinafter.

The objects of the present invention are accomplished by ionic copolymers comprising a polymer of an α-olefin having the general formula $RCH=CH_2$ where R is a radical selected from the class consisting of hydrogen and alkyl radicals having from 1 to 8 carbon atoms, the olefin content of said polymer being at least 50 mol percent based on the polymer, and an α,β-ethylenically unsaturated carboxylic acid having 1 or 2 carboxylic acid groups, the acid monomer content of said polymer being from 0.2 to 25 mol percent based on the polymer, said carboxylic acid-containing polymer containing uniformly distributed throughout the polymer, one or more metal ions having ionized valences of 1 to 3 inclusive where the acid comonomer is monocarboxylic, and an ionized valence of one where the acid comonomer is dicarboxylic, the quantity of the metal ion being sufficient to neutralize at least 10 percent of the said carboxylic acid.

The α-olefin polymers employed in the formation of the ionic copolymers of the present invention are copolymers of α-olefins with ethylenically unsaturated acids. As indicated, the α-olefins employed in the copolymer are α-olefins which have the general formula $RCH=CH_2$ where R is either a hydrogen or an alkyl group having preferably from 1 to 8 carbon atoms. Thus, suitable olefins include ethylene, propylene, butene-1, pentene-1, hexene-1, heptene-1, 3-methylbutene-1, 4-methylpentene-1, etc. Although polymers of olefins having higher carbon numbers can be employed in the present invention, they are not materials which are readily obtained or available. The concentration of the α-olefin is at least 50 mol percent in the copolymer, and is preferably greater than 80 mol percent.

The second essential component of the base copolymer comprises an α,β-ethylenically unsaturated carboxylic acid group containing monomer having preferably from 3 to 8 carbon atoms. Examples of such monomers are acrylic acid, methacrylic acid, ethacrylic acid, itaconic acid, maleic acid, fumaric acid, monoesters of said dicarboxylic acids, such as methyl hydrogen maleate, methyl hydrogen fumarate, ethyl hydrogen fumarate and maleic anhydride. Although maleic anhydride is not a carboxylic acid in that it has no hydrogen attached to the carboxyl groups, it can be considered an acid for the purposes of the present invention because of its chemical reactivity being that of an acid. Similarly, other α,β-monoethylenically unsaturated anhydrides of carboxylic acids can be employed. As indicated, the concentration of acidic monomer in the copolymer is from 0.2 mol percent to 25 mol percent, and, preferably, from 1 to 10 mol percent.

The base copolymers employed in forming the ionic copolymers of the present invention may be prepared in several ways. Thus, the copolymers may be obtained by the copolymerization of a mixture of the olefin and the carboxylic acid monomer. This method is preferred for the copolymers of ethylene employed in the present invention. Methods employed for the preparation of ethylene carboxylic acid copolymers have been described in the literature. However, as pointed out further hereinafter, the preferred products are those obtained from base copolymers in which the carboxylic acid groups are randomly distributed over all of the copolymer molecules. Such distribution is obtained using the technique described in detail in coassigned application Serial No. 119,265 filed June 26, 1961, now abandoned. In brief, that technique requires carrying out the copolymerization of the α-olefin and the carboxylic acid monomers in a single phase environment, i.e. one in which the monomers are soluble, e.g. benzene or ethylene, which may be in liquid or vaporized form. Preferably, and especially when relatively small amounts of the carboxylic acid component are desired in the base copolymer, the process is continuous, the monomers being fed to the reactor in the ratio of their relative polymer-forming reactivities and the residence time in the reactor being limited so that from about 3-20% of the ethylene-monomer feed is converted to polymer. In a preferred process, a mixture of the two monomers is introduced into a polymerization environment maintained at high pressures, 50 to 3000 atmospheres, and elevated temperatures, 150 to 300° C., together with a free radical polymerization initiator such as a peroxide.

Copolymers of α-olefins with carboxylic acids may also be prepared by copolymerization of the olefin with an α,β-ethylenically unsaturated carboxylic acid derivative which subsequently or during copolymerization is reacted either completely or in part to form the free acid. Thus, hydrolysis, saponification or pyrolysis may be employed to form an acid copolymer from an ester copolymer.

Although ionic crosslinks can also be formed with copolymers obtained by grafting an α,β-ethylenically unsaturated carboxylic acid monomer to a polyolefin base, such copolymers do not show the degree of improvement obtained with copolymers formed by direct copolymerization, i.e., direct copolymers. To insure uniform ionic crosslinking throughout the copolymer, it is essential to employ a copolymer containing the carboxylic acid groups randomly distributed over all molecules. Such random distribution is best obtained by direct copolymerization. Graft copolymers which contain a third non-reactive monomer grafted to the carboxylic acid copolymer are, of course, satisfactory.

The copolymers employed to form ionic copolymers which are useful as plastics are preferably of high molecular weight in order to achieve the outstanding combination of solid state properties of crosslinked polyolefins with the melt fabricability of uncrosslinked polyolefins. Although the mechanical properties of a low molecular weight copolymer are improved by the process of the present invention, the resulting product does not exhibit such mechanical properties as are markedly superior to the same unmodified copolymer, when of high molecular weight. The molecular weight of the copolymers useful as base resins is most suitably defined by melt index, a measure of viscosity, described in detail in ASTM-D-1238-57T. The melt index of copolymers employed in the formation of ionic copolymers which are useful as plastics is preferably in the range of 0.1 to 1000 g./10 min., and, more particularly, in the range of 1.0 to 100 g./10 min. However, it should be pointed out that low molecular weight copolymers result in ionic copolymers which, although not suitable as plastics, are outstanding adhesives and laminating resins.

The copolymer base need not necessarily comprise a two component polymer. Thus, although the olefin content of the copolymer should be at least 50 mol percent, more than one olefin can be employed to provide the hydrocarbon nature of the copolymer base. Additionally, other copolymerizable monoethylenically unsaturated monomers, illustrative members of which are mentioned below in this paragraph, can be employed in combination with the olefin and the carboxylic acid comonomer. The scope of base copolymers suitable for use in the present invention is illustrated by the following examples: Ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate copolymers, ethylene/methacrylic acid/ethyl acrylate copolymers, ethylene/itaconic acid/methyl methacrylate copolymers, ethylene/methyl hydrogen maleate/ ethyl acrylate copolymers, ethylene/methacrylic acid/ vinyl acetate copolymers, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/ fumaric acid/vinyl methyl ether copolymers, ethylene/ vinyl chloride/acrylic acid copolymers, ethylene/vinylidene chloride/acrylic acid copolymers, ethylene/vinyl fluoride/methacrylic acid copolymers, and ethylene/chlorotrifluoroethylene/methacrylic acid copolymers.

The copolymers may also, after polymerization but prior to ionic crosslinking, be further modified by various reactions to result in polymer modifications which do not interfere with the ionic crosslinking. Halogenation of an olefin acid copolymer is an example of such polymer modification.

The preferred base copolymers, however, are those obtained by the direct copolymerization of ethylene with a monocarboxylic acid comonomer.

The ionic copolymers of the present invention are obtained by the reaction of the described copolymer base with an ionizable metal compound. This reaction is referred to herein as "neutralization." The reaction mechanism involved in the formation of the ionic copolymers and the exact structure of the copolymers are at the present time not completely understood. However, a comparison of the infrared spectrum of the copolymer base with that of the ionic copolymer shows the appearance of an absorption band at about 6.4 micron which is characteristic of the ionized carboxyl group, $COO^-$, a decrease in the crystallinity band at 13.7 micron and a substantial decrease, depending on the degree of neutralization, of a band at 10.6 micron, characteristic of the unionized carboxyl group, $COOH$. It is consequently deduced that the surprising properties of ionic copolymers are the result of an ionic attraction between the metal ion and one or more ionized carboxylic acid groups.

This ionic attraction results in a form of crosslinking which occurs in the solid state. However, when molten and subjected to the shear stresses which occur during melt fabrication, the ionic crosslinks of these polymers are ruptured and the polymers exhibit melt fabricability essentially the same as that of the linear base copolymer. On cooling of the melt and in the absence of the shear stress occurring during fabrication, the crosslinks, because of their ionic nature, are reformed and the solidified copolymer again exhibits the properties of a crosslinked material.

The change in properties resulting from the neutralization of the base copolymer to the ionic copolymer is greatly influenced by the degree of neutralization and, therefore, the number of ionic crosslinks and the nature of the crosslink involved. Although an improvement in solid state properties is obtained with even a small percentage of the acid groups neutralized, in general, a noticeable improvement is observed only after 10 percent of the acid groups have been neutralized. However, to obtain the optimum solid state properties which are derivable from ionic copolymers, the number of crosslinks should be sufficient to form an infinite network of crosslinked polymer chains. This, of course, not only depends on the degree of neutralization, but also on the number of crosslinking sites and the molecular weight of the base copolymer. In general, it was found that base copolymers having molecular weights as measured by melt index of 1 to 5 g./10 min. and a monocarboxylic acid concentration of 5 to 10 percent show optimum solid state properties upon 50 to 80 percent neutralization. The degree of neutralization can be decreased as the molecular weight of the copolymer base is increased or as the acid content of the copolymer base is increased without significantly changing the solid state properties. In general, no substantial further improvement in solid state properties is observed if the crosslinking is continued beyond the point at which an infinite network is formed. However, the shear stress necessary to break the ionic crosslinks and, thus, make the copolymer melt fabricable is steadily increased with an increasing number of crosslinks beyond that necessary to achieve an infinite network.

The melt fabricability of the ionic copolymer is affected not only by the number of crosslinks, but to a much greater degree, is affected by the nature of the crosslink. The combination of certain types of acid copolymers with certain metal ions results in intractible materials which do not lend themselves to melt fabrication. Thus, it was found that base copolymers with dicarboxylic acid comonomers, even those in which one acid radical has been esterified, when neutralized with metal ions which have two or more ionized valences, result in intractible ionic copolymers at the level of neutralization essential to obtain significant improvement in solid state properties. Similarly, base copolymers with monocarboxylic acid comonomers result in intractible ionic copolymers when neutralized to the indicated degree with metal ions which have four or more ionized valences. It is believed that the nature of the ionic bond in these instances is too strong to be suitable for the formation of ionic copolymers which exhibit solid state properties of crosslinked resins and melt properties of uncrosslinked resins.

Metal ions which are suitable in forming the ionic copolymers of the present invention can be divided into two categories, uncomplexed metal ions and complexed metal ions. In the uncomplexed metal ions the valence of the ion corresponds to the valence of the metal. These metal ions are obtained from the commonly known and used metal salts. The complexed metal ions are those in which the metal is bonded to more than one type of salt group, at least one of which is ionized and at least one of which is not. Since the formation of the ionic copolymers requires only one ionized valence state, it will be apparent that such complexed metal ions are equally well suited in the present invention. The term "metal ion having one or more ionized valence states" means a metal ion having the general formula $Me^{+n}X_m$, where $n$ is the ionic charge and is at least one, $X$ is a nonionized group and $n+m$ equal the valence of the metal. The utility of complexed metal ions employed in the formation of ionic copolymers corresponds in their ionized valences to those of the uncomplexed metal ions. The monovalent metals are, of course, excluded but higher valent metals may be included depending on how many metal valences are complexed and how many can be ionized. The preferred complexed metal ions are those in which all but one metal valences are complexed and one is readily ionized. Such compounds are in particular the mixed salts of very weak acids, such as oleic and stearic acid, with ionizable acids, such as formic and acetic acid.

The uncomplexed metal ions which are suitable in forming the ionic copolymers of the present invention, therefore comprise for the α-olefin-monocarboxylic acid copolymers, mono-, di- and trivalent ions of metals in Groups, I, II, III, IV–A and VIII of the Periodic Table of Elements (see page 392, Handbook of Chemistry and Physics, Chemical Rubber Publishing Co., 37th ed.). Uncomplexed monovalent metal ions of the metals in the stated groups are also suitable in forming the ionic copolymers of the present invention with copolymers of olefins and ethylenically unsaturated dicarboxylic acids. Suitable monovalent metal ions are $Na^+$, $K^+$, $Li^+$ $Cs^+$, $Ag^+$, $Hg^+$ and $Cu^+$. Suitable divalent metal ions are $Be^{+2}$, $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Pb^{+2}$, $Fe^{+2}$, $Co^{+2}$, $Ni^{+2}$ and $Zn^{+2}$. Suitable trivalent metal ions are $Al^{+3}$, $Sc^{+3}$, $Fe^{+3}$ and $Y^{+3}$.

The preferred metals, regardless of the nature of the base copolymer are the alkali metals. These metals are preferred because they result in ionic copolymers having the best combination of improvement in solid state properties with retention of melt fabricability. It is not essential that only one metal ion be employed in the formation of the ionic copolymers and more than one metal ion may be preferred in certain applications.

The quantity of ions employed or the degree of neutralization will differ with the degree of solid property change and the degree of melt property change desired. In general, it was found that the concentration of the metal ion should be at least such that the metal ion neutralizes at least 10 percent of the carboxylic acid groups in order to obtain a significant change in properties. As explained above, the degree of neutralization for optimum properties will vary with the acid concentration and the molecular weight of the copolymer. However, it is generally desirable to neutralize at least 50 percent of the acid groups. The degree of neutralization may be measured by several techniques. Thus, infrared analysis may be employed and the degree of neutralization calculated from the changes resulting in the absorption bands. Another method comprises the titration of a solution of the ionic copolymer with a strong base. In general, it was found that the added metal ion reacts stoichiometrically with the carboxylic acid in the polymer up to 90 percent neutralizations. Small excess quantities of the crosslinking agent are necessary to carry the neutralization to completion. However, large excess quantities of the crosslinking agent do not add to the properties of the ionic copolymer of the present invention, since once all carboxylic acid groups have been ionically crosslinked, no further crosslinks are formed.

The crosslinking of the ionic copolymer is carried out by the addition of a metal compound to the base copolymer. The metal compound which is employed must have at least one of its valences satisfied by a group which is substantially ionized in water. The necessary ionization is determined by the water solubility of the metal when bonded solely to the ionizable salt group. A compound is considered water-soluble for the purposes of the present invention if it is soluble in water at room temperature to the extent of 2 weight percent. This requirement is explained as separating those ionic compounds which are capable of exchanging a metal ion for the hydrogen ion of the carboxylic acid group in the copolymer from those which do not interact with the acid. The second requirement of the metal compound employed to give rise to the ionic crosslink is that the salt radical reacting with the hydrogen of the carboxylic acid group must form a compound which is removable from the copolymer at the reaction conditions. This requirement is essential to obtain the carboxylic acid group of the copolymer in ionic form and, furthermore, to remove the salt radical from the copolymer so that the attraction between the ionized carboxylic acid group of the copolymer and the metal ion is not overshadowed by the attraction of the metal ion and its original salt radical. With these two parameters it is, therefore, possible to determine those metal compounds which form metal ions having the required ionic valences. Although the foregoing limits delineate metal compounds suitable in forming metal ions in the acid copolymers which result in ionic crosslinks, certain types of compounds are preferred because of their ready availability and ease of reaction. Preferred metal salts include formates, acetates, hydroxides of sufficient solubility, methoxides, ethoxides, nitrates, carbonates and bicarbonates. Metal compounds which are generally not suitable in resulting in ionic crosslinks include in particular metal oxides because of their lack of solubility and the fact that such compounds form intractible compositions, metal salts of fatty acids which either are not sufficiently soluble or form compounds with the hydrogen of the acid which can not be removed and metal coordination compounds which lack the necessary ionic character.

As set forth hereinabove, in addition to uncomplexed metal ions, complexed metal ions which contain the necessary ionic valences bonded to groups meeting the aforesaid requirements can be employed. In such cases the group which does not ionize or is not removed has no effect on the ability of the ionizing group to be removed and the resulting metal ion to cause the ionic crosslinking. Thus, whereas zinc distearate or calcium dioleate are ineffective to cause ionic crosslinking such mixed metal salts as zinc stearate-acetate or calcium oleate-acetate are effective crosslinking agents.

It is not essential that the metal compound be added as such, but it is possible to form the metal compound in situ from components which react with each other in the desired manner in the polymer environment. Thus, it is possible to add a metal oxide to the base copolymer then add an acid such as acetic acid in the proper proportion and form the ionic compound, i.e., the metal acetate, while the polymer is milled.

The crosslinking reaction is carried out under conditions which allow for a homogeneous uniform distribution of the crosslinking agent in the base copolymer. No particular reaction conditions are essential except that the conditions should permit the removal of the hydrogen-salt radical reaction product which is preferably accomplished by volatilization. Since the homogeneous distribution of the crosslinking agent and the necessary volatilizaton of the hydrogen-salt radical reaction product is difficult at room temperature, elevated temperatures are generally employed. More specifically, the crosslinking reaction is carried out either by melt blending the polymer with the crosslinking metal compound, which preferably is employed in solution, or by adding the crosslinking agent, directly or in solution, to a solution of the copolymer base and then, on reaction, precipitating and separating the resulting polymer. Of these techniques, the first is greatly preferred because of its relative simplicity. It is to be understood, however, that the specific technique employed is not critical as long as it meets the specific requirements set forth above. The course of the neutralization, i.e., the degree to which the metal ion is ionically linked with the carboxylate ion and the carboxylate hydrogen has reacted with the metal compound anion and has been removed, can be readily followed by infrared spectroscopy through measurement of the nonionized and ionized carboxylate groups.

The following examples further illustrate the methods employed in forming the ionic copolymers of the present invention. Neutralization as used in the examples is based on the percentage of carboxylate ions as compared to carboxylic acid groups.

EXAMPLE I

A 500 g. sample of an ethylene/methacrylic acid copolymer, containing 10 weight percent of methacrylic acid and having a melt index of 5.8 g./10 min. (ASTM–D–1238–57T) was banded on a 6 inch rubber mill at 150° C. After the copolymer had attained the mill temperature, 24 g. of sodium methoxide dissolved in 100 ml. of methanol was added to the copolymer over a period of 5 minutes as working of the copolymer on the mill was continued. Melt blending of the composition was continued for an additional 15 minutes during which time the initially soft, fluid melt became stiff and rubbery on the mill. However, the polymer could still be readily handled on the mill. The resulting product was found to have a melt index of less than 0.1 g./10 minutes and resulted in transparent, as compared to opaque for the copolymer base, moldings of greatly improved tensile properties.

EXAMPLE II

To a solution of 50 g. of an ethylene/methacrylic acid copolymer containing 10 weight percent of methacrylic acid and having a melt index of 5.8 g./10 minutes in 250 ml. of xylene maintained at a temperature of 100° C. was added 3 g. of strontium hydroxide dissolved in 50 ml. of water. Gelation followed immediately. The product was recovered by precipitation with methanol and washed thoroughly with water and acetone. The final dry product was found to have a melt index of 0.19 g./10 minutes and resulted in glass clear moldings.

EXAMPLE III

To 50 g. of an ethylene/methacrylic acid copolymer containing 10 weight percent of methacrylic acid and having a melt index of 5.8 g./10 minutes milled at a temperature of 125 to 135° C. on a 6 inch rubber mill was added gradually 6.3 g. of magnesium acetate ($\times 4H_2O$) in 25 ml. of water. Milling was continued for 15 minutes at which time the evolution of acetic acid had ceased. The product had a melt index of 0.12 g./10 minutes and resulted in clear, resilient moldings.

EXAMPLE IV

To 50 g. of an ethylene/itaconic acid copolymer having a melt index of 9 g./10 minutes and containing 3 percent by weight of the copolymer of itaconic acid was gradually added 3 g. of sodium hydroxide in 20 ml. of water while the polymer was being worked on a 6 inch rubber mill at a temperature of 150° C. Upon addition of the hydroxide, the polymer melt became stiff, transparent and elastomeric.

EXAMPLE V

To 50 g. of a copolymer of ethylene and maleic anhydride, containing 7 weight percent of copolymerized maleic anhydride and having a melt index of 8.5 g./10 minutes, being milled on a rubber mill at a temperature of 135° C., is added 22.8 g. of zinc monoacetate monostearate. After 15 minutes on the mill a transparent, tough resilient polymer product is obtained having sufficient melt flow for fabrication into film by standard melt extrusion. Repeating the experimental procedure with zinc acetate an intractible resin is formed within 10 minutes of milling, preventing further milling. The resin could not be extruded into a film using standard melt extrusion.

EXAMPLE VI

To 50 g. of a copolymer of ethylene and methacrylic acid, containing 10 weight percent of copolymerized methacrylic acid and having a melt index of 5.8 g./10 minutes, being milled on a rubber mill at 130° C. are added the following components in the order indicated: (a) 3.25 g. zinc oxide, (b) 11.7 g. stearic acid, and (c) 2.5 g. of acetic acid. Only after the addition of the acetic acid does the melt become clear and an increase in viscosity is observed. After 10 minutes of further milling the copolymer is removed. Although the melt index is reduced, the resulting ionic copolymer is suitable for melt fabrication.

EXAMPLE VII

An ethylene/methacrylic acid copolymer containing 10 percent methacrylic acid was banded on a two roll mill at 170° C. and 3.6 weight percent of powdered sodium hydroxide was added over a period of 2 minutes. Milling was continued over a period of 10 minutes to ensure homogeneity. The ionic copolymer obtained was reduced more than tenfold in melt index and was glass clear and resilient. When extruded as a melt, the ionic copolymer could be drawn into fibers having pronounced elastic recovery.

Specific examples of the ionic copolymers of the present invention and their properties are shown in the following tables.

Table I shows physical properties of ionic copolymers obtained from an ethylene/methacrylic acid copolymer with monovalent, divalent and trivalent metal ions. The ethylene/methacrylic acid copolymer employed contained 10 weight percent of the acid and had a melt index of 5.8 g./10 minutes. In addition to the improvements shown in the table, all these ionic copolymers exhibited excellent bend recovery which was not exhibited by the copolymer base. The tests were carried out on compression molded sheets of the ionic copolymer.

ionic copolymer are compared and contrasted against the flow number which corresponds to the melt index, except

Table I

| Metal Cation | | Na+ | Li+ | Sr++ | Mg++ | Zn++ | Al+++ |
|---|---|---|---|---|---|---|---|
| Metal Anion | | CH₃O- | OH- | OH- | CH₃COO- | CH₃COO- | CH₃COO- |
| Weight percent of Cross linking Agent | | | 4.8 | 2.8 | 9.6 | 8.4 | 12.8 | 14 |
| Melt Index, g./10 min | 5.8 | 0.03 | 0.12 | 0.19 | 0.12 | 0.09 | 0.25 |
| Yield Point[1] in p.s.i | 890 | 1,920 | 1,906 | 1,954 | 2,176 | 1,926 | 1,035 |
| Elongation[1] in percent | 553 | 330 | 317 | 370 | 326 | 313 | 347 |
| Ult. Tens. St.[1] in p.s.i | 3,400 | 5,200 | 4,920 | 4,900 | 5,862 | 4,315 | 3,200 |
| Stiffness[2] | 10,000 | 27,600 | 30,000 | 32,400 | 23,800 | 30,170 | 15,000 |
| Transparency (visual) | Hazy | Clear | Clear | Clear | Clear | Clear | Clear |

[1] ASTM D-412-51T.  [2] ASTM D-747-58T.

Table II shows the effect of varying concentrations of crosslinking agent and varying concentrations of carboxylic acid groups on the solid state properties of an ethylene methacrylic acid copolymer employing sodium methoxide as the crosslinking agent. The term "stoichiometric" as employed in the table indicates such quantities of the metal ion as are necessary to form ionic links with all of the polymer carboxylate groups.

that a temperature of 250° C. and a weight of 5000 g. is employed. Polyethylene which is crosslinked by peroxides or by ionizing radiation shows no flow for the conditions employed to measure the flow number. As can be seen from the table, at low shear stresses, i.e., under conditions at which melt index is measured, the ionic copolymers have low melt indices as compared to the base copolymers. However, at higher temperatures

Table II

| | | | | | | |
|---|---|---|---|---|---|---|
| Percent Methacrylic Acid | 5 | 10 | 10 | 10 | 10 | 16. |
| Percent Sodium Added | Excess of Stoichiom. | 70% of Stoichiom. | 90% of Stoichiom. | Stoichiom. | Excess of Stoichiom. | Excess of Stoichiom. |
| Copolymer Base Melt Index in g./10 min. | 5 | 5.8 | 5.8 | 5.8 | 5.8 | 25. |
| Melt Index of Crosslinked Polymer in g./10 min. | 0.34 | 0.09 | 0.05 | 0.02 | 0.01 | 0.01. |
| Yield Point[1] | 1,300 | 1,924 | 1,900 | 1,900 | 1,950 | 2,390. |
| Elongation[1] | 273 | 330 | 300 | 340 | 190 | 250. |
| Ult. Tens. Str.[1] | 3,550 | 5,200 | 4,200 | 5,000 | 3,300 | 5,500. |
| Stiffness[2] | 14,200 | 27,600 | 26,200 | 27,200 | 24,600 | 39,000. |
| Transparency | Slight Haze | Clear | Clear | Clear | Clear | Clear. |

[1] ASTM-D-412-51T.  [2] ASTM-D-747-58T.

Table III illustrates the ionic crosslinking of ethylene/dicarboxylic acid copolymers using sodium acetate as the crosslinking agent. The table also illustrates that the crosslinking is more effective with high molecular weight copolymers than with low molecular weight copolymers, although with both a significant decrease of melt flow is obtained in the melt indexer.

and under higher shear stresses the ionic copolymers show greatly improved flow.

Table IV further illustrates some of the requirements which must be met to obtain the ionic copolymers of the present invention. Thus, the use of zinc metal (Product No. 7) which is not ionized, does not result in any ionic crosslinking. Zinc oxide, which is ionic when dissolved

Table III

| Copolymer | Percent Sodium Hydroxide | Melt Index in g./10 min. | Yield Strength[1] in p.s.i. | Ult. Tens. Strength in p.s.i. | Elongation in percent[1] | Stiffness[2] in p.s.i. | Transparency |
|---|---|---|---|---|---|---|---|
| Ethylene/3 wt. percent maleic anhydride copolymer | | 1,000 | 1,185 | 1,180 | 200 | 18,000 | Opaque. |
| Do | 1.2 | 0.1 | 1,300 | 2,100 | 290 | 17,400 | Hazy. |
| Ethylene/2-3 wt. percent methyl hydrogen maleate copolymer | | 6.8 | 1,250 | 2,000 | 520 | 19,000 | Opaque. |
| Do | 1.8 | 0.1 | 1,350 | 3,100 | 380 | 23,500 | Hazy. |
| Ethylene/2-3 wt. percent maleic acid copolymer | | 44.5 | 1,420 | 1,800 | 450 | 24,600 | Opaque. |
| Do | 6 | No flow | 1,440 | 3,000 | 260 | 17,000 | Hazy. |
| Ethylene/6 wt. percent itaconic acid copolymer | | 9.0 | 1,320 | 1,800 | 433 | 15,800 | Opaque. |
| Do | 2.0 | 0.11 | 1,528 | 1,900 | 180 | 3,000 | Hazy. |

[1] ASTM-D-412-51T.  [2] ASTM-D-747-58T.

Table IV shows the surprising melt properties of the ionic copolymers. The ionic copolymers illustrated were obtained by reacting aqueous or methanolic solutions of the crosslinking agents indicated in the table with the copolymers indicated on a two roll mill at temperatures of 150 to 200° C. until homogeneous compositions were obtained. In each instance sufficient quantities of the crosslinking agent were added to neutralize all of the acid groups. The melt index of the copolymer base and the in water and when employed as a crosslinking agent (Product No. 8), results in only a partial ionic copolymer because zinc oxide does not dissolve sufficiently in water or other polar solvents. Zinc stearate is not effective as a crosslinking agent (Product No. 9) to give rise to an ionic copolymer because the stearate radical remains in the polymer. As can be seen from the combination of a monocarboxylic acid with a trivalent metal (Product No. 6) a borderline improvement in the melt flow properties is obtained at higher shear stresses which is explained by the greater ionic attraction between the metal ion in a higher valence state and the carboxylic acid group. The inoperability of divalent metal ions and dicarboxylic acid groups (Products 21 and 17) to result in ionic copolymers of the present invention is also illustrated. These polymers are believed to have such strong ionic bonds that they in effect act like regularly crosslinked polyolefins. The table further illustrates the wide variety of metal ions which are suitable crosslinking agents. Additionally, the table also shows that the presence of a third monomer does not interfere in the formation of the ionic copolymers of the present invention.

EXAMPLE X

Using the ionic copolymer of Example VIII injection molded combs, chain links, gears, coil forms and chips were made. A one ounce machine fitted with a ⅞-inch cylinder was employed. The machine was operated at a cylinder temperature of 225° C. and a mold temperature of 55° C. Pressures ranging from 3000 to 6000 p.s.i. and a 30/30 second cycle were found to be adequate. The moldings were tough and transparent and reproduced the finest details of the molds employed. Polyethylene of the same melt index did not fill the molds under these conditions.

*Table IV*

| Product No. | Comonomer(s) | Comonomer Conc. | Crosslinking Reagent | Copolymer Base M.I., g./10 min. | Ionic Copolymer M.I. in g./10 min. | Flow Number in g./10 min. |
|---|---|---|---|---|---|---|
| 1 | Methacrylic Acid | 10.0 | Sodium Hydroxide | 6.3 | 0.03 | 4.9 |
| 2 | do | 10.0 | do | 5.8 | No flow | 5.5 |
| 3 | do | 10.0 | Lithium Hydroxide | 5.8 | 0.12 | 6.5 |
| 4 | do | 10.0 | Zinc Acetate | 5.8 | 0.13 | 7.0 |
| 5 | do | 10.0 | Magnesium Acetate | 5.8 | 0.107 | 6.5 |
| 6 | do | 10.0 | Aluminum Hydroxide | 5.8 | 0.2 | 0.5 |
| 7 | do | 10.0 | Zinc Metal | 5.8 | 6.5 | |
| 8 | do | 10.0 | Zinc Oxide | 5.8 | 0.98 | |
| 9 | do | 10.0 | Zinc Stearate | 5.8 | 4.8 | |
| 10 | do | 10.0 | Nickel Acetate | 5.8 | 0.25 | |
| 11 | do | 10.0 | Cobalt Acetate | 5.8 | 0.13 | |
| 12 | do | 10.0 | Sodium Carbonate | 5.8 | 0.05 | |
| 13 | do | 10.0 | Tin Acetate | 5.8 | 0.17 | |
| 14 | do | 10.0 | Sodium Methoxide | 5.8 | 0.03 | |
| 15 | do | 10.0 | Sodium Formate | 5.8 | 0.08 | |
| 16 | Itaconic Acid | 6 | Sodium Hydroxide | 9.0 | 0.11 | 0.8 |
| 17 | do | 6 | Strontium Hydroxide | 9.0 | No flow | No flow |
| 18 | do | 6 | Zinc Oxide | 9.0 | No flow | No flow |
| 19 | Maleic Anhydride | 3 | Sodium Hydroxide | 300 | No flow | 1.2 |
| 20 | do | 3 | Lithium Hydroxide | 300 | 0.008 | 1.66 |
| 21 | do | 3 | Zinc Acetate | 300 | No flow | No flow |
| 22 | Vinyl Acetate plus Methacrylic Acid | 15 / 5 | Sodium Hydroxide | 5.5 | 0.45 | 7.2 |
| 23 | Vinyl Acetate plus Methacrylic Acid | 15 / 5 | Magnesium Acetate | 5.5 | 0.12 | 5.8 |
| 24 | Methyl Methacrylate plus Methacrylic Acid | 15 / 5 | Sodium Hydroxide | 3.6 | 0.16 | 6.2 |
| 25 | Styrene plus Methacrylic Acid | 15 / 5 | do | 6.0 | 0.13 | 7.5 |

EXAMPLE VIII

An ethylene/methacrylic acid copolymer containing 10 percent of methacrylic acid was ionically crosslinked with sodium hydroxide until 76 percent of the carboxyl groups had been neutralized. The melt index of the resulting polymer was 0.65 g./10 minutes. This resin was extruded through a one inch extruder equipped with a tubular film die and take-off. The ionic copolymer was extruded into 0.5 mil film using a 225° C. temperature for the extruder barrel and a 250° C. temperature for the die. The resulting film was completely haze-free and transparent. Dart drop test gave a value of 375 g. at 0.5 mil thickness. Comparable values for polyethylene ($\rho$=0.92 g./cc.) are 50 g. Pneumatic impact was 7.4 kg.-cm./mil; a polyterephthalate ester film has a value of 6.5 kg.-cm./mil. In addition to its excellent impact resistance, this film displayed marked shrinkage when immersed in boiling water making it ideal for many packaging applications. X-ray examination showed the film to be biaxially oriented.

EXAMPLE IX

Using the ionic copolymer of Example VIII, a 30 mil wire coating was produced on #14 copper wire. A three and one-quarter inch Davis-Standard wire coater fitted with an 0.124 inch tapered pressure die was employed. Extrusion was carried out at 450 ft./minute using temperature settings of 475° F. on the barrel and 490° F. on the die and quench temperatures of 200° F. to 72° F. A very smooth, glassy, coating was obtained displaying excellent toughness and electrical properties. Polyethylene having the same melt index could not be extruded into a continuous smooth wire coating under these conditions.

EXAMPLE XI

Using the ionic copolymer of Example VIII, four ounce Boston Round bottles were prepared. The resin was extruded through a two-inch extruder fitted with a crosshead tubing die (O.D. 11/16 inch, I.D. ½ inch) and blown into a bottle using a 4 ounce Boston Round bottle mold. The resin was heated to 175° C. in the extruder. The extrusion screw speed was 25 r.p.m. The bottles obtained were stiff, transparent and directly printable.

The foregoing examples and experimental data have demonstrated the surprising combination of improvement in solid state properties and retention of melt properties obtained by the compositions of the present invention. One of the more apparent improvements obtained is that of transparency. Hydrocarbon polymers are generally not transparent in all but exceptionally thin forms and even there special techniques such as quenching and drawing must be employed to obtain a measure of transparency. The copolymers of the present invention, however, can be made to be transparent even in thick molded sections. Another solid state property which is markedly improved by ionic crosslinking is the resilience or bend recovery of the copolymer. In contrast to hydrocarbon polymers which have a slow and incomplete recovery from bend, the copolymers of the present invention snap back when deformed and assume their original shape. The improvement obtained in tensile properties and stiffness is apparent from the data presented in the tables. In this respect the copolymers of the present invention exhibit greatly surprising properties. In contrast to peroxide-crosslinked polyethylene where the stiffness is decreased by crosslinking, the ionic copolymers exhibit even greater stiffness and rigidity than the unmodified base polymer. Other solid state properties improved by ionic crosslinking are toughness and stress-crack resistance. The impact strength of thin films made from ionic copolymers is equal to and better than that of polyterephthalate films which are considered the toughest plastic films commercially available. Tests designed to measure stress-crack resistance of hydrocarbon polymers using detergents commonly used in such tests failed to result in failures and, thus, the ionic copolymers are considered to be free from stress-cracking.

The ionic copolymers of the present invention also exhibit highly surprising rheological properties. Thus, although having extremely low melt indices, which would indicate that the ionic copolymers are not metal fabricable, the opposite is true in that the ionic copolymers can be melt extruded, injection molded and compression molded with ease. This is explained, of course, by the difference in shear stress exerted on the melt in a melt indexer and in an extruder, for example. At low shear stresses the high melt strength of the polymer results in low melt flow. However, once this is overcome by a higher shear stress, the ionic copolymers flow readily. The combination of high melt strength at low shear stresses and good melt flow at high shear stresses is highly desirable in all applications requiring forming of the melt subsequent to extrusion such as in bottle blowing in which an extruded parison is blown into a bottle and in thermoforming in which molten sheet is forced against a mold by means of a vacuum. In both these fabrication techniques, the polymer melt becomes unsupported during some part of the fabrication cycle and it is, therefore, highly desirable that the polymer melt have a high melt strength and a good retention of shape. Similarly, the ionic copolymers of the present invention are extremely useful for the preparation of foams in that they overcome the extremely low strength of the foamed but not yet solidified polymer which has been a major problem in foam extrusion and which frequently has caused the collapse of the foam.

An additional advantage that can be obtained in the copolymers of the present invention is coloration. By proper choice of metal ions and combinations of metal ions many colors can be produced in the ionic copolymers. This method coloration has advantages over polymer dyeing in that dyes have a tendency to exude from hydrocarbon polymers and frequently are not compatible therewith. It also has an advantage over coloration by pigmentation in that the coloration is more uniform and even, particularly in light colors. Furthermore, colored compositions can be made transparent.

The ionic copolymers may be modified, if desired, by the addition of antioxidants, stabilizers, fillers and other additives commonly employed in hydrocarbon polymers. The ionic copolymers can be blended with each other and all hydrocarbon polymers in general to achieve improvement in properties of those polymers with which the ionic copolymers are blended. It is generally preferred to employ additives which do not interfere with the ionic crosslinks, i.e., compounds which do not meet the requirement of crosslinking compounds set forth above or if ionic in nature to employ such metal ions as would complement the metal ions used in the crosslinking. Generally, however, additives do not interfere with the ionic crosslinks since they are not of the type which would result in metal ions and, furthermore, are employed in very small quantities. If desirable, the copolymers of the present invention can be blended with other hydrocarbon polymers to meet particular needs of an application. In order to realize the surprising properties obtained in ionic copolymers, it is essential that the ionic copolymers do not contain any significant number of covalent crosslinks, since the latter would obscure and overshadow the ionic crosslinking.

The high molecular weight ionic copolymers of the present invention can be extruded into films of excellent clarity, fibers of outstanding elasticity and resilience, pipes with superior stress-crack resistance, wire coatings with improved cut-through resistance and good dielectric properties despite the presence of metal ions, and foamed sheets; they can be further injection molded into intricate shapes and closely retain the dimension of the mold; they can be vacuum formed, blow molded and compression molded with greater ease and better properties than linear hydrocarbon polymers. Ionic copolymers can, furthermore, be drawn and uniaxially or biaxially oriented. Ionic copolymer surfaces, are printable and adhere well to adhesives commercially available. Thus, they can be laminated to paper, metal foil and other plastic surfaces. The adhesion of the ionic copolymer is so good that they themselves can be employed as adhesives. Low molecular weight ionic copolymers, particularly are useful for such purposes. Many other uses and modifications of the ionic copolymers of the present invention will be apparent from the foregoing description and it is not intended to exclude such from the scope of this invention.

I claim:
1. Ionic copolymers of α-olefins having the formula R—CH=CH$_2$, where R is a radical selected from the class consisting of hydrogen and alkyl radicals having from 1 to 8 carbon atoms, and α,β-ethylenically unsaturated carboxylic acids having from 3 to 8 carbon atoms, said copolymers having from 10% to 90% of the carboxylic acid groups ionized by neutralization with metal ions uniformly distributed throughout the copolymer, said copolymer being a direct copolymer of the α-olefins and the unsaturated carboxylic acid in which the carboxylic acid groups are randomly distributed over all molecules and in which (1) the α-olefin content of the copolymer is at least 50 mol percent, based on the α-olefin-acid copolymer, (2) the unsaturated carboxylic acid content of the copolymer is from 0.2 to 25 mol percent, based on the α-olefin-acid copolymer, and (3) any other monomer component optionally copolymerized in said copolymer is monoethylenically unsaturated, and said metal ions having an ionized valence of from one to three inclusive when the unsaturated acid is a monocarboxylic acid and an ionized valence of one when the unsaturated acid is a dicarboxylic acid and said metal ions being selected from the group consisting of uncomplexed and complexed metal ions, said ionic copolymers having solid state properties characteristic of crosslinked polymers and melt-fabricability properties characteristic of uncrosslinked, thermoplastic polymers.

2. Ionic copolymers of ethylene and an α,β-unsaturated monocarboxylic acid having from 3 to 8 carbon atoms, said copolymers having from 50% to 80% of the carboxylic acid groups ionized by neutralization with metal ions having an ionized valence of from one to three inclusive uniformly distributed throughout the copolymer, said metal ions being selected from the group consisting of uncomplexed and complexed metal ions, said copolymer being a direct copolymer of ethylene and the unsaturated monocarboxylic acid in which the carboxylic acid groups are randomly distributed over all molecules and in which the ethylene content of the copolymer is from 90 to 99 mol percent, based on the ethylene-acid copolymer, and the unsaturated monocarboxylic acid content of the copolymer is a complementary amount from 10 to 1 mol percent, based on the ethylene-acid copolymer, said ionic copolymers having solid state properties characteristic of cross-linked polymers and melt-fabricability properties characteristic of uncrosslinked, thermoplastic polymers.

3. Ionic copolymers of claim 1 in which the α,β-ethylenically unsaturated carboxylic acid is monocarboxylic.

4. Ionic copolymers of claim 1 in which the α-olefin of formula R—CH=CH$_2$ is ethylene and the α,β-ethylenically unsaturatd carboxylic acid is monocarboxylic.

5. Ionic copolymers of claim 1 in which the α-olefin of formula R—CH=CH$_2$ is ethylene and the α,β-ethylenically unsaturated carboxylic acid is a dicarboxylic acid having from 4–8 carbon atoms.

6. The ionic copolymer set forth in claim 5 wherein the metal ions are complexed metal ions selected from the group consisting of complexed metal ions of metals in Groups II, III, IV–A and VIII of the Periodic Table of Elements.

7. The ionic copolymer set forth in claim 3 wherein the metal ion is an ion of a metal in Group I of the Periodic Table of Elements.

8. The ionic copolymer set forth in claim 7 wherein the metal ion is an ion of an alkali metal.

9. The ionic copolymer set forth in claim 3 wherein the metal ion is an ion of a metal in Group II of the Period Table of Elements.

10. The ionic copolymer set forth in claim 9 wherein the metal ions are magnesium ions.

11. The ionic copolymer of claim 3 wherein from 50 to 80 percent of the said α,β-unsaturated carboxylic acid is neutralized by the said metal ions.

12. The ionic copolymer set forth in claim 4 wherein the α,β-unsaturated monocarboxylic acid is acrylic acid.

13. The ionic copolymer set forth in claim 4 wherein the α,β-unsaturated monocarboxylic acid is methacrylic acid.

14. The ionic copolymer set forth in claim 2 wherein the metal ions are alkali metal ions.

15. The ionic copolymer set forth in claim 14 wherein the metal ions are sodium ions.

16. The ionic copolymer set forth in claim 2 wherein the metal ions are ions of a metal of Group II of the Periodic Table of Elements.

17. The ionic copolymer set forth in claim 16 wherein the metal ions are zinc ions.

18. The ionic copolymer set forth in claim 4 wherein the copolymer is an interpolymer of ethylene, methacrylic acid and a third copolymerizable monomer.

19. The ionic copolymer set forth in claim 18 wherein the third copolymerizable monomer is vinyl acetate.

20. The ionic copolymer set forth in claim 18 wherein the third copolymerizable monomer is methyl methacrylate.

21. The ionic copolymer of claim 3 wherein the α-olefin is a mixture of ethylene and propylene.

22. The ionic copolymer of claim 3 wherein the metal ions are complexed metal ions selected from the group consisting of complexed metal ions of metals in Groups II, III, IV–A and VIII of the Periodic Table of Elements.

23. The ionic copolymer set forth in claim 5 wherein the metal ions are alkali metal ions.

24. The ionic copolymer set forth in claim 5 wherein the α,β-unsaturated dicarboxylic acid is maleic acid.

25. The ionic copolymer set forth in claim 4 wherein the α,β-unsaturated monocarboxylic acid is methyl hydrogen maleate.

26. The ionic copolymer set forth in claim 5 wherein the α,β-unsaturated dicarboxylic acid is fumaric acid.

27. The ionic copolymer set forth in claim 5 wherein the α,β-unsaturated dicarboxylic acid is itaconic acid.

28. The ionic copolymer set forth in claim 5 wherein from 50 to 80 percent of said carboxylic acid groups are ionized by neutralization with metal ions.

29. The ionic copolymer of claim 28 wherein the metal ions are sodium ions.

30. The product of claim 4 in film form.
31. The product of claim 4 in foamed form.
32. The product of claim 4 in funicular form.
33. The product of claim 4 in tubular form.
34. The product of claim 4 in the form of a coating.
35. The product of claim 30 in biaxially oriented form.

References Cited by the Examiner

UNITED STATES PATENTS

| | | | |
|---|---|---|---|
| 2,599,123 | 6/1952 | Pinkney | 260—78.5 |
| 2,646,425 | 7/1953 | Barry | 260—88.1 |
| 2,798,053 | 7/1957 | Brown | 260—88.1 |
| 2,854,357 | 9/1958 | Johnson et al. | 260—78.5 |
| 3,132,120 | 5/1964 | Graham | 260—86.7 |

JOSEPH L. SCHOFER, *Primary Examiner.*

L. WOLF, *Assistant Examiner.*